Jan. 29, 1957 A. W. SMITH 2,779,116
LOOSE-LEAF ALBUM FOR VIEWING PHOTOGRAPHIC SLIDES
Filed Jan. 12, 1954 2 Sheets-Sheet 1

INVENTOR
ARTHUR W. SMITH
BY Lancaster, Allwine and Rommel
ATTORNEYS

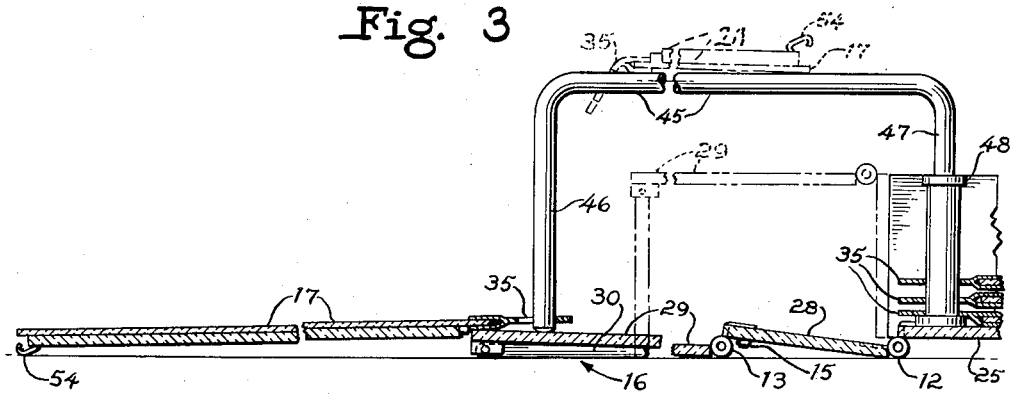
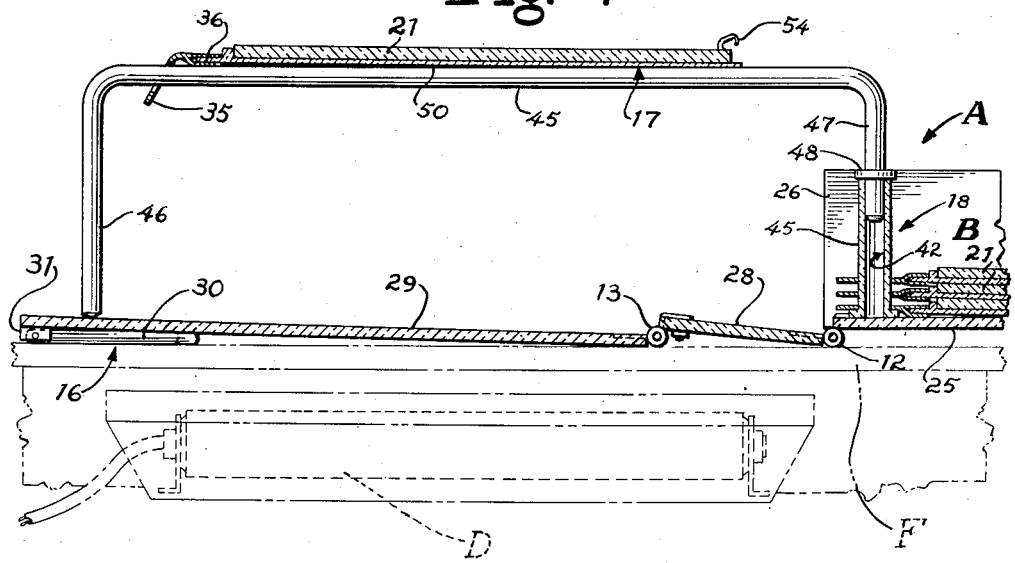
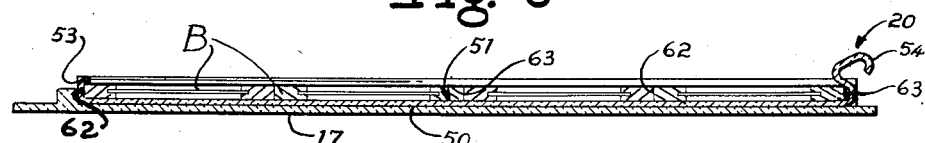
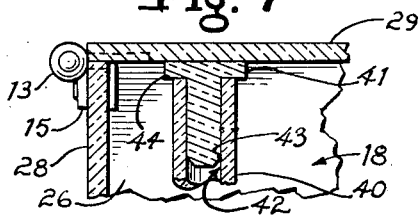

United States Patent Office 2,779,116
Patented Jan. 29, 1957

2,779,116

LOOSE-LEAF ALBUM FOR VIEWING PHOTOGRAPHIC SLIDES

Arthur W. Smith, Washington, D. C., assignor, by decree of distribution, to Guileme Mitchell Smith, Washington, D. C.

Application January 12, 1954, Serial No. 403,582

3 Claims. (Cl. 40—102)

This invention relates to loose-leaf albums for the mounting, display and examination of material such as photographic slides and the like.

An important object of the invention is to provide an album for this purpose wherein the material, as a plurality of slides or the like, may be mounted upon each of a plurality of sheets or leaves contained in a suitable receptacle portion, and the material viewed by light transmitted through the slides but without detaching the sheets from the receptacle portion.

Another important object of the invention is to provide an album as just described in which the source of the light may be disposed beneath a raised, substantially transparent horizontal cover of the receptacle portion and a substantially transparent sheet or leaf disposed upon the cover and carrying transparent slides, but with the light source spaced from this cover, so that the rays will project through all of this material, or this cover may be disposed directly upon a surface, as a glass showcase top, with the light source within the showcase and positioned for its rays to project through the surface, the horizontal cover, a sheet or leaf disposed upon the cover, and slides carried by the sheet.

Furthermore, an important object is to provide a loose-leaf album including a receptacle or binder portion for the sheets thereof, which receptacle portion has certain well portions which are pivotally attached to other portions and may be positioned in various planes to provide for proper use of the album.

Yet another object is to provide guide means for guiding the sheets of an album to take positions within the receptable portion of the album, to second positions outwardly of but next adjacent the receptacle portion, and to third positions spaced remotely from the same so they will not interfere with the second position of another sheet. In all three positions, the sheets are attached to the receptacle portion but it is possible to manipulate the guiding means so that the sheets, or any one of them, may be detached from the receptacle portion.

Additionally, an important object is to provide removable trays for containing a plurality of the slides or the like which are detachably held by the sheets of the album, with the slides detachably retained by the trays.

Another important object is to provide hinge means for the sheets of the album whereby the sheets may be readily manually turned or swung in an arc or may be slid horizontally in paths in order to place them in positions for viewing the material carried thereon.

Still another important object is to provide dual-function means, providing a cover for the album and means to prevent accidental movement of removable stops carried by sheet hinge-receiving posts of the album.

Other objects and advantages of the invention will be apparent during the course of the following detailed description, taken in connection with the accompanying drawings, forming a portion of this disclosure and in which drawings:

Fig. 3 is a fragmentary vertical section through a portion of the opened album with some of the parts in dotted lines positioned as in Fig. 2, and a sheet in full lines and containing the material inspected now positioned in a zone beyond the viewing zone, the parts being positioned in full lines, for viewing the material with a source of illumination beneath a transparent fixed support.

Fig. 4 is a fragmentary vertical section with the sheet and other parts of the album positioned for viewing the material with a source of illumination beneath a fixed support.

Fig. 6 is a vertical longitudinal section through one of the sheets and trays of Fig. 5.

Fig. 7 is an enlarged fragmentary section of a novel hinge post associated with the sheets.

Figure 1:
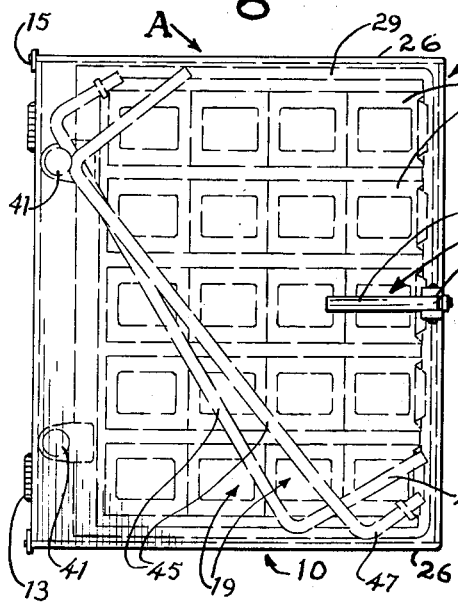
Fig. 1 is a top plan of the new album in a closed position.

In the drawings, wherein for the purpose of illustration is shown a preferred embodiment of the invention and wherein similar reference characters designate corresponding parts throughout the several views, the letter A designates the new album and B designates the material for mounting therein; C and D designate light sources and E and F designate supports.

The album A comprises an enclosure or receptacle portion 10, means 11 and 12 for pivotally connecting two of the walls of the enclosure to another portion of the latter, means 13 for pivotally connecting a cover of the enclosure to one of the walls, closure fasteners 14 and 15 for certain parts of the enclosure 10, prop or support means 16 for a portion of the enclosure, a plurality of sheets 17, loose-leaf means 18 for mounting the sheets 17 in the enclosure 10, guiding and positioning means 19 for manually guiding the sheets 17 into various positions with respect to the enclosure 10, removable trays 20 for removably retaining the material B, and means 21 for removably attaching the trays 20 to the sheets 17.

Figure 2:
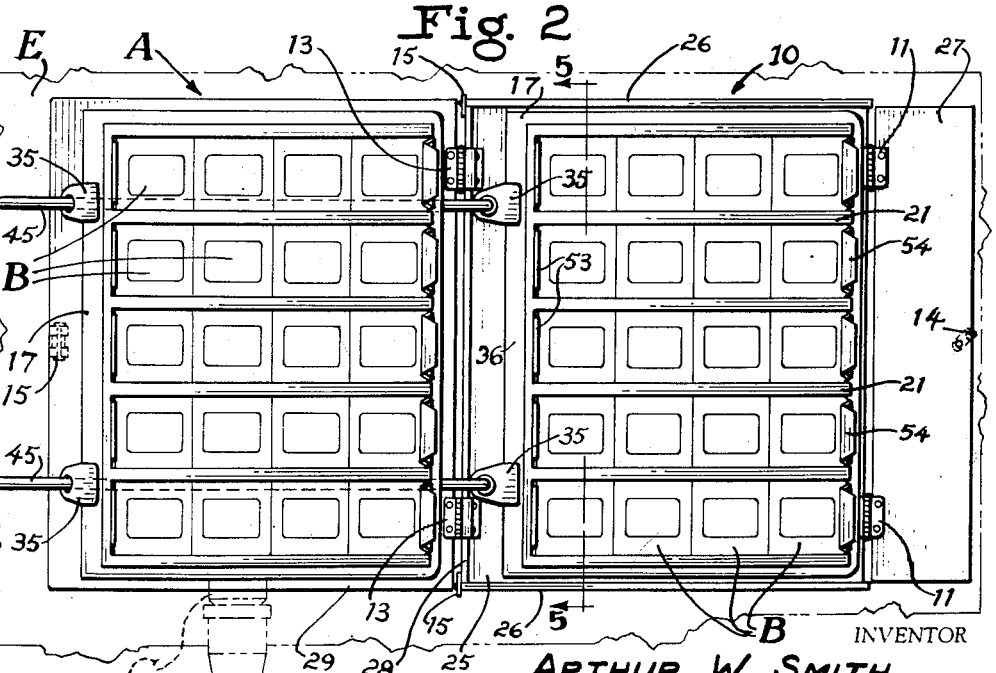
Fig. 2 is a top plan of the album but with the same in an open position and a sheet thereof carrying material to be inspected through the sheet by the aid of a lamp beneath the sheet.

Referring mainly to Fig. 2, the receptacle portion 10 preferably comprises a rectangular box or book with a bottom wall or rear cover 25, parallel side walls 26 preferably rigidly secured thereto, an end wall 27, an end wall or back 28 which walls 27 and 28 are preferably pivotally connected to the bottom wall or cover 25, and a front cover or closure 29 which also has another function, as will be explained. Preferably all the walls and the cover 29 are of rigid hardened plastic material and at least the wall 28 and cover 29 are of substantially transparent plastic and thin (a thickness of one-eighth inch, for example, has been found satisfactory). For appearance, durability and the other well-known advantages of such material, I prefer to provide all the walls of substantially transparent rigid hardened plastic material. I may conventionally treat the surface or surfaces of the cover and end wall 28 as by slight etching in order to minimize glare.

One end wall 27 is pivotally connected at its lower edge portion to an edge portion of the bottom wall 25 by the means 11, which may be suitable hinges.

The other end wall 28 is pivotally connected at its lower edge portion to the edge portion of the bottom wall 25 opposite the first-mentioned edge portion thereof by the means 12, which may be suitable hinges.

The cover 29 is pivotally connected to the upper end portion of the wall 28 as by the means 13 which are preferably hinges.

Closure fasteners 14 and 15 of any approved conventional construction are provided to secure the end wall 27 to the closure 29 and the end wall 28 to the side walls 26 respectively. In the examples shown the closure fasteners are hooks and keepers.

The prop or support means 16 is a suitable length 30 of material, such as that of the walls of the enclosure, pivotally connected, as by a conventional hinge 31, to the outer face of the closure 29 at the free edge portion of the closure and disposed substantially an equal distance from the ends of this free edge portion, with this length 30 substantially as long as the height of either wall 27 or 28, whereby when the enclosure is substantially horizontal, the length 30 is extended normal to the closure 29 and the latter is swung outwardly, the length 30 will maintain the closure substantially horizontal.

A suitable number of sheets 17 may be housed within the receptacle portion 10 and these are preferably of rigid hardened plastic material. The sheets are substantially transparent. Each sheet is slightly narrower than the bottom wall 25 and they are provided with a plurality of flexible eyed tabs or projections 35 which extend outwardly from the edge portion 36 of the sheet 17 for association with the means 18 and 19 as will be subsequently described. Preferably, there are two tabs 35 for each sheet.

The loose-leaf means 18 for mounting the sheets 17 into the receptacle 10 comprises, in the example shown, a pair of projections, being a pair of spaced-apart hinge posts 40 rigidly secured to and extending upwardly from the bottom wall 25 closely adjacent the end wall or back 28. The tabs 35 are adapted to be slidably mounted over these posts 40. I prefer to provide removable stops or headed members 41, best shown in Fig. 7, for mounting at the upper or free end portion of the posts. For example, I may provide sockets 42 in the free end portions of the posts to receive the plug or shank portions 43 of the stops 41 with the heads 44 thereof of greater diameter than the diameters of the eye of any of the eyed tabs 35, whereby, when the tabs 35 are mounted upon the posts and the enclosure tilted, for example, the heads 44 will prevent them from sliding off the posts. The length of each post plus the thickness of the head 44 is such that, when the stops 41 are in place, the inner face of the cover or closure 29 will contact the upper faces of the heads 44 and prevent the stops 41 from working loose.

Means 19 for manually guiding the sheets 17 into various positions with respect to the enclosure 10, comprises a suitable number of elongated members which are preferably rods of the material comprising the enclosure 10. Each member comprises a major substantially straight portion 45, a foot portion 46 at one end of the portion 45 and substantially mostly normal thereto but having a gooseneck or curved connection with the portion 45 and a post-engaging portion 47 at the opposite end of the portion 45 having a substantially like connection with the portion 45 and provided, intermediate its ends, with a peripheral shoulder 48. The lengths of the portions 46 and 47 are such that, when the portions 45 are substantially horizontal or parallel with the plane of the bottom wall 25, the free ends of the portions 46 will contact a suitbale support E with the end wall 27 and closure 29 disposed as in Fig. 2, or these free ends will contact the upper face of the closure 29 when the latter and the end wall 27 are disposed as in Figs. 3 or 4. It can be appreciated from Fig. 4 that when the closure 29 and end wall 27 are in their respective positions as in Fig. 2, the major portion 45 will be spaced above the closure 29. Of course, the free end part of the portion 47 below the shoulder 48 is adapted to extend snugly into a socket 42 in a post 40, upon removal of the stop 41. When not in use, the means 19 may be disposed within the receptacle 10.

Figure 5:
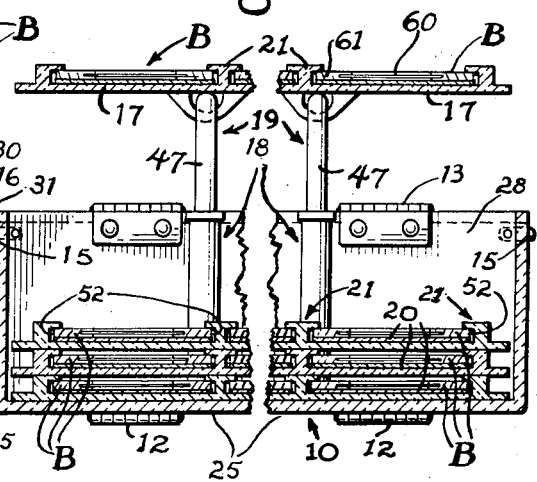
Fig. 5 is a vertical transverse fragmentary section showing a plurality of the sheets of the album with trays removably carried thereby, the trays containing material to be viewed.

Referring mainly to Figs. 5 and 6, the removable trays 20 for removably retaining the material B, each comprises a body portion 50 of suitable substantially transparent slightly flexible hardened plastic in sheet form, having an upper material contacting face 51 substantially parallel side edges 52, one end edge portion 53 being upturned to provide a stop or shoulder and the opposite end edge portion 54 being formed somewhat into an S in longitudinal section (as in Fig. 6) to provide a springy or resilient stop and a handle. The width of each body portion 50 is preferably slightly greater than the width of the material B which is carried by the tray 19 but the length of the body portion 50 is such that a certain plurality of the material B may be disposed end-to-end and snugly accommodated between the end edge portions 53 and 54 with a part of the portion 54 bearing against the adjacent end edge 63 of the material B. By slightly flexing the body portion 50 the material B, shown, for example, as photographic slides comprising transparencies 60 within frames 61 having end edges 62 and 63, may be removed from or inserted into the trays 19 and, because of their end-to-end abutment and abutment with the end edge portions 53 and 54, they will remain in place upon the upper faces 51 of the trays.

Means 21 for removably attaching the trays 20 to the sheets 17 comprise, for each tray, two substantially parallel spaced-apart guides, T-shaped or inverted L-shaped in transverse section, and suitably secured to the bottom wall 25 to project upwardly therefrom and extend transversely thereof, and a plurality of these guides will provide slideways in conjunction with the bottom wall 25 so that the overhanging portions of the guides will overhang and contact portions of the upper face of the tray disposed within the slideway and the tray may be slid in and out of the same.

When the album A, containing the material B, is not in use, the receptacle 10 is closed with the cover 29 and end walls 27 and 28 latched in closed positions. This provides suitable protection for the material B and the album may be stored or transported and, because of the substantially transparent walls, the uppermost of the leaves carrying some of the material, will be exposed. The album is pleasing in appearance and may be exhibited in this condition in a showcase or on a counter, etc. Of course, the album may be employed to house photographic slides, for example, accumulated by the photographer himself with the sheets 17 and slides arranged in any desirable order whereby screen projection may be carried out in a desired order and especially expeditiously. In this case, the parts of the receptacle are disposed substantially as in Fig. 3 and one after another of the sheets are swung to the left-hand portion of the sheet in that figure.

In the event the material B is to be exhibited, as, for example, by a dealer in the material B, the material may be exhibited in two ways. That is, with the sheets 17 disposed, one after another, on the major portions 45 of the means 19 with a suitable light source C between the cover 29 and a support E below the cover, or the sheets may be exhibited while disposed, one after another on the major portions 45 with the light source D disposed below the portions 45, the cover 29 and a substantially transparent support F. Or, in other words, beneath a glass showcase top with a light source within the showcase. In any case, the material B will be so remote from the light sources C or D that there will not apt to be any damage to the material from heat given off by the light source.

At no time need there be more than one sheet upon the portions 45 since they may be moved to the extreme left position of the sheet in Fig. 3 after being exhibited.

The flexibility of the eyed tabs or projections 35 at the edge portions 36 of the sheets 17 permit, in conjunction with the specific means 19 for guiding the sheets, the sheets to be either turned as leaves of a book (loose-leaf) are ordinarily turned or the sheets 17 may be slid along the major portion 45 without turning them at all until they are turned to assume the extreme left-hand position of the sheet 17 in Fig. 3. Thus, the material B when it reaches the position for viewing is right-side-up (as it was in the receptacle) but since the sheet 17 may be slid, as described, or simply turned, the material may be disposed for viewing with the sheet uppermost and the material beneath it.

Various changes in the shape, size and arrangement of parts may be made to the form of invention herein shown and described, without departing from the spirit of the invention or scope of the claims.

What is claimed is:

1. A loose-leaf album for mounting transparencies for display and examination, said album including back and front, rear covers; means hingedly connecting said back to said front cover for manually pivoting said front cover to an open position; a plurality of sheets normally contained between said covers and each sheet provided with a projection-received portion, said front cover and sheets being of rigid substantially transparent material; loose-leaf means for mounting said sheets between said covers including a projection extending from the inner face of said rear cover and disposed closely adjacent said back and constructed and arranged to slidably receive said portions; guiding and positioning means, including an elongated substantially straight horizontally-disposed major support portion, removably connected with said projection, for guiding said sheets, one after another, from said projection to substantially flat horizontal positions upon said major support portion, over and spaced from said front cover, with only one of said sheets disposed flat and horizontally upon said major support portion at any one time and said projection-received portion thereof in sliding contact with said major support portion, and for guiding said sheets, one after another, from said major support portion, and positioning said sheets in substantially the same vertical plane in a stack in a location outwardly of the vertical plane of said front cover and remote from said back and rear cover, whereby said front cover is between said stack and said back; and means for retaining transparencies upon said sheets whereby a source of illumination may be disposed below said front cover when in an open position for illuminating the transparencies retained upon a sheet disposed upon said major support portion.

2. A loose-leaf album according to claim 1 characterized in that said projection is a post provided with a socket in its free end, and said guiding and positioning means includes a post-engaging portion, at one end of said major support portion, for removably extending into said socket, and a foot portion, at the other end of said major support portion, substantially paralleling and longer than said post-engaging portion.

3. A loose-leaf album according to claim 1 characterized in that said projection is a post provided with a socket in its free end and a headed member, having a shank portion removably disposed in said socket and a head greater in width than the width of said post, the length of said post plus the thickness of said head being substantially the same as the height of said back whereby, when said front cover is closed, a portion of said front cover will rest upon said head and retain said headed member in position upon said post, and said guiding and positioning means includes a post-engaging portion, at one end of said major support portion, for removably extending into said socket when said headed member has been removed from said post, and a foot portion, at the other end of said major support portion, substantially paralleling said post-engaging portion.

References Cited in the file of this patent

UNITED STATES PATENTS

| | | |
|---|---|---|
| 403,826 | Cooke | May 21, 1889 |
| 1,098,154 | Housh | May 26, 1914 |
| 1,326,832 | Baily | Dec. 30, 1919 |
| 1,711,070 | Snydam | Apr. 30, 1929 |
| 1,849,243 | Moore | Mar. 15, 1932 |
| 2,227,898 | Grant | Jan. 7, 1941 |
| 2,334,176 | De Sherbinin | Nov. 16, 1943 |
| 2,558,996 | Ullmann | July 3, 1951 |
| 2,637,323 | Lockwood | May 5, 1953 |

FOREIGN PATENTS

| | | |
|---|---|---|
| 7,584 | Great Britain | May 15, 1890 |